United States Patent
Dry et al.

(10) Patent No.: US 9,751,440 B2
(45) Date of Patent: Sep. 5, 2017

(54) PASSIVE AIR SUSPENDED SEAT COMFORT LAYER HAVING AREAS OF DIFFERING PRESSURES

(71) Applicant: Ford Global Technologies, LLC, Dearborn, MI (US)

(72) Inventors: Alan George Dry, Grosse Pointe Woods, MI (US); Joseph S. Talamonti, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 112 days.

(21) Appl. No.: 14/939,767

(22) Filed: Nov. 12, 2015

(65) Prior Publication Data
US 2017/0136926 A1    May 18, 2017

(51) Int. Cl.
| B60N 2/56 | (2006.01) |
| B60N 2/68 | (2006.01) |
| B60N 2/70 | (2006.01) |
| B60N 2/58 | (2006.01) |

(52) U.S. Cl.
CPC ........... *B60N 2/5642* (2013.01); *B60N 2/565* (2013.01); *B60N 2/5657* (2013.01); *B60N 2/58* (2013.01); *B60N 2/68* (2013.01); *B60N 2/70* (2013.01); *B60N 2/7017* (2013.01)

(58) Field of Classification Search
None
See application file for complete search history.

(56) References Cited

U.S. PATENT DOCUMENTS

| 4,580,837 | A | | 4/1986 | Bayley | |
| 4,965,899 | A | * | 10/1990 | Sekido | B60N 2/665 297/284.11 |
| 5,243,722 | A | * | 9/1993 | Gusakov | A47C 7/021 297/DIG. 3 |
| 5,403,065 | A | * | 4/1995 | Callerio | B64G 6/00 297/180.11 |
| 5,617,595 | A | * | 4/1997 | Landi | A61G 5/1043 297/452.41 |
| 5,638,565 | A | * | 6/1997 | Pekar | A47C 4/54 5/653 |
| 5,902,014 | A | * | 5/1999 | Dinkel | B60N 2/5635 297/180.1 |
| 6,003,950 | A | * | 12/1999 | Larsson | A47C 7/74 297/180.13 |
| 6,109,688 | A | * | 8/2000 | Wurz | A47C 7/744 297/180.13 |
| 6,206,465 | B1 | * | 3/2001 | Faust | A47C 7/74 297/180.1 |
| 6,206,474 | B1 | * | 3/2001 | Kruse | B60N 2/70 297/284.3 |

(Continued)

*Primary Examiner* — David E Allred
(74) *Attorney, Agent, or Firm* — Vichit Chea; Price Heneveld LLP (57) ABSTRACT

A vehicle seating assembly includes a seating frame. A plurality of cellular supports include multiple base cells and multiple support cells. The multiple support cells are disposed directly above and include a different air pressure than the base cells. A diaphragm is proximate the base cells and the support cells. An air passage is defined through the diaphragm between adjacent cellular supports. An open air distribution layer extends over the cellular supports. A breathable coverstock extends over the distribution layer.

5 Claims, 9 Drawing Sheets

(56) References Cited

U.S. PATENT DOCUMENTS

| | | | | |
|---|---|---|---|---|
| 6,273,810 B1 * | 8/2001 | Rhodes, Jr. | ............... | A47C 4/54 |
| | | | | 297/180.13 |
| 6,547,327 B1 * | 4/2003 | Yates | ......................... | B62J 1/22 |
| | | | | 297/200 |
| 6,808,230 B2 * | 10/2004 | Buss | .................... | B60N 2/5657 |
| | | | | 297/180.12 |
| 7,168,758 B2 | 1/2007 | Bevan et al. | | |
| 7,350,851 B2 * | 4/2008 | Barvosa-Carter | .. | B60N 2/42709 |
| | | | | 296/187.02 |
| 7,828,050 B2 * | 11/2010 | Esaki | ................ | B60H 1/00285 |
| | | | | 165/202 |
| 8,235,462 B2 * | 8/2012 | Bajic | ........................ | A47C 7/72 |
| | | | | 297/180.1 |
| 2004/0245811 A1 | 12/2004 | Bevan et al. | | |
| 2013/0140857 A1 | 6/2013 | Shin et al. | | |
| 2015/0329027 A1 * | 11/2015 | Axakov | ................... | A47C 7/00 |
| | | | | 297/180.13 |
| 2016/0095775 A1 * | 4/2016 | Dzioba | ............. | A61G 7/05776 |
| | | | | 5/644 |
| 2017/0036574 A1 * | 2/2017 | Dry | ...................... | B60N 2/5621 |

* cited by examiner

PASSIVE AIR SUSPENDED SEAT COMFORT LAYER HAVING AREAS OF DIFFERING PRESSURES

FIELD OF THE DISCLOSURE

The present disclosure generally relates to a vehicle seating assembly, and more particularly to a passive air suspended seat comfort layer for a vehicle seating assembly.

BACKGROUND OF THE DISCLOSURE

Modern vehicle seats are becoming more and more comfortable as a further understanding of human ergonomics, posture, and comfortability is studied. Vehicle seating assemblies that include comfort components in the vehicle seat back and the vehicle seat can provide the driver and passengers with improved comfort and increased endurance for extensive vehicle rides. Additionally, various sizes and shapes of drivers and passengers can prove challenging when providing vehicle seating assemblies. Accordingly, vehicle seating assemblies that include components to accommodate the different sizes and shapes of drivers and passengers, as well as the desired posture and sitting positions of those drivers and passengers, has become increasingly important.

SUMMARY OF THE DISCLOSURE

According to one aspect of the present disclosure, a vehicle seating assembly includes a seating frame. A plurality of cellular supports include multiple base cells and multiple support cells. The multiple support cells are disposed directly above and include a different air pressure than the base cells. A diaphragm is proximate the base cells and the support cells. An air passage is defined through the diaphragm between adjacent cellular supports. An open air distribution layer extends over the cellular supports. A breathable coverstock extends over the distribution layer.

According to another aspect of the present disclosure, a vehicle seating assembly includes a plurality of cellular supports defined between an upper skin and a lower skin. The plurality of cellular supports extend over a top surface and side surfaces of a vehicle seat. A breathable coverstock extends over the upper skin. A recess is defined between the breathable coverstock and the upper skin. An open air distribution layer extends over the plurality of cellular supports. A breathable coverstock extends over the distribution layer.

According to yet another aspect of the present disclosure, a method of making a vehicle seating assembly. A recess is formed in an upper substrate layer. A plurality of partitioned cells are formed in a lower substrate layer. The upper substrate layer is coupled with the lower substrate layer to define a support cell assembly. An open air distribution layer is positioned over the support cell assembly. The open air distribution layer is covered with a coverstock.

These and other aspects, objects, and features of the present disclosure will be understood and appreciated by those skilled in the art upon studying the following specification, claims, and appended drawings.

DETAILED DESCRIPTION OF THE EMBODIMENTS

Figures 1, 2:
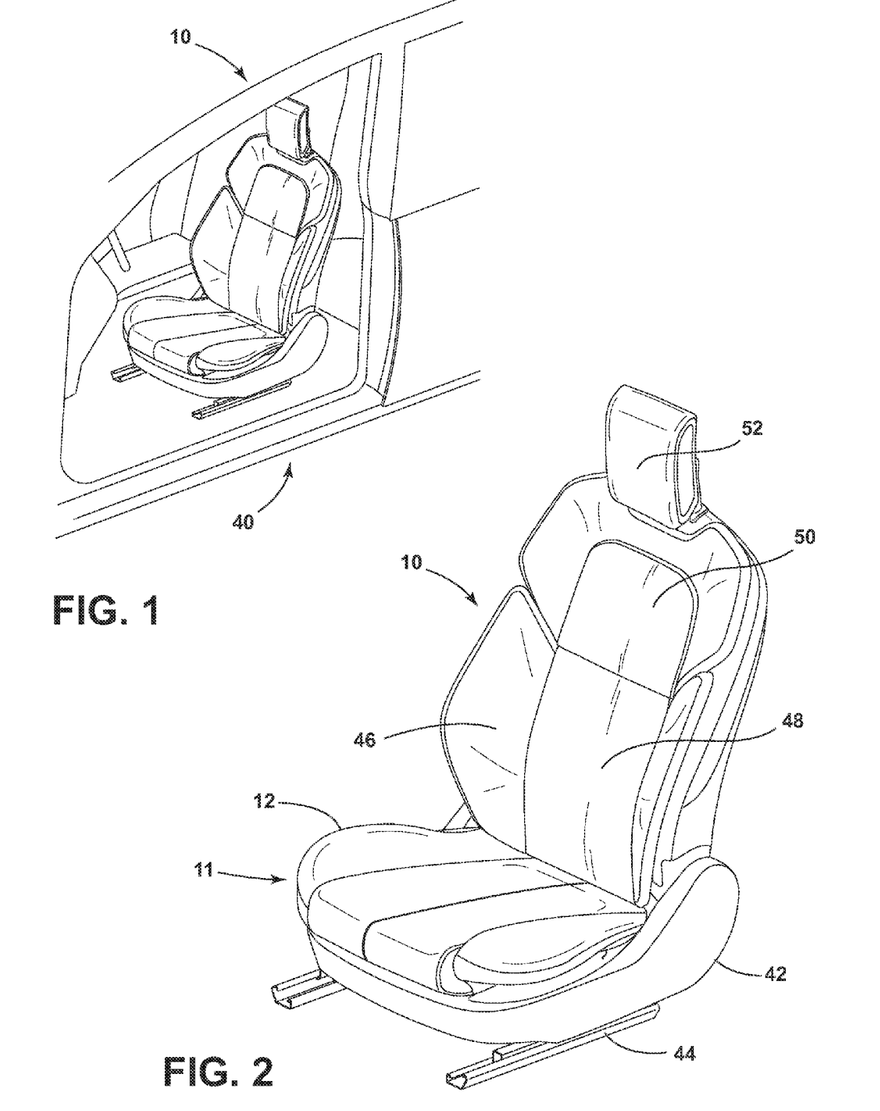
FIG. 1 is a top perspective view of one embodiment of a vehicle seating assembly of the present disclosure disposed in a vehicle.
FIG. 2 is a top perspective view of the vehicle seating assembly of FIG. 1.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims.

Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the embodiment generally illustrated in FIGS. 1-16, reference numeral 10 generally designates a vehicle seating assembly having a vehicle seat 12 with a passive air suspended seat comfort layer 11. A plurality of cellular supports 14 include multiple base cells 16 and multiple partition cells or support cells 18. The multiple support cells 18 are disposed directly above and include a different air pressure than the base cells 16. A diaphragm 20 is proximate the base cells 16 and the support cells 18. An air passage 22 is defined through the diaphragm 20 between adjacent cellular supports 14. An open air distribution layer 24 extends over the cellular supports 14. A breathable coverstock 26 extends over the distribution layer 24.

With reference to FIGS. 1 and 2, the present disclosure is generally directed to a vehicle seating assembly 10 for use in a vehicle 40, such as a car, a truck, a van, etc. It is also contemplated that the concept set forth in this disclosure may be utilized in a front or forward seat of the vehicle 40 as well as back or rearward seats of the vehicle 40. The vehicle seating assembly 10, as illustrated, includes a seat base 42 that is positioned on rail slides 44 to allow fore and aft movement of the vehicle seating assembly 10 relative to the vehicle 40. The vehicle seat 12 is positioned on the seat base 42 and is movable relative thereto, as set forth in further detail below. In addition, the vehicle seating assembly 10 includes a seatback 46 having a lower lumbar region 48 and an upper thoracic region 50 as well as a head restraint 52. Each of the components of the seatback 46 may be configured for adjustability to properly support the weight of various occupants inside the vehicle 40.

Figure 3A:
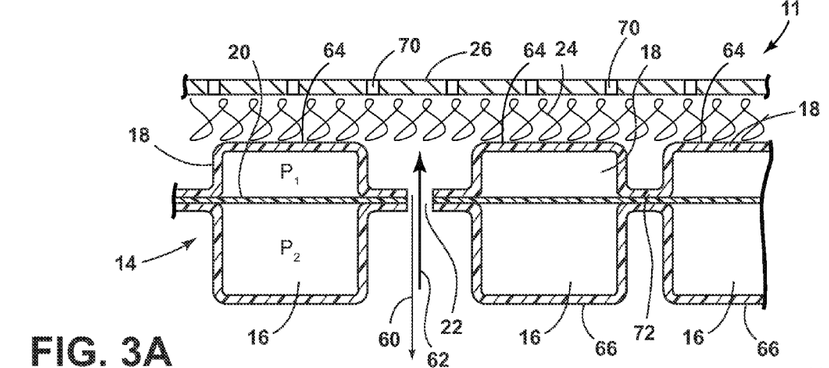
FIG. 3A is a partial side elevational cross-sectional view of one embodiment of an air suspended comfort layer of the present disclosure.
Figure 3B:
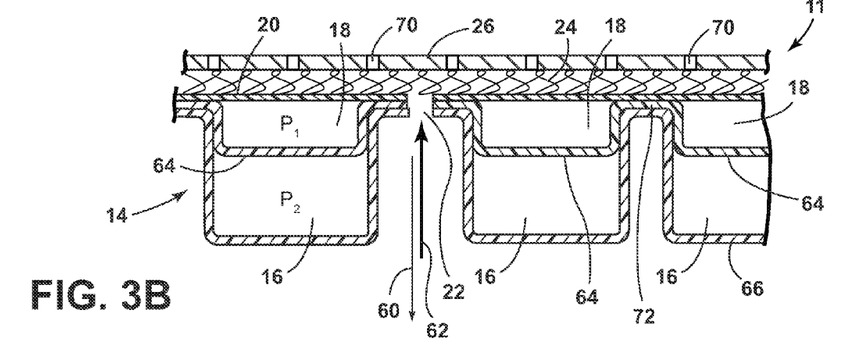
FIG. 3B is a partial side elevational cross-sectional view of an alternative embodiment of an air suspended comfort layer of the present disclosure.
Figure 3C:
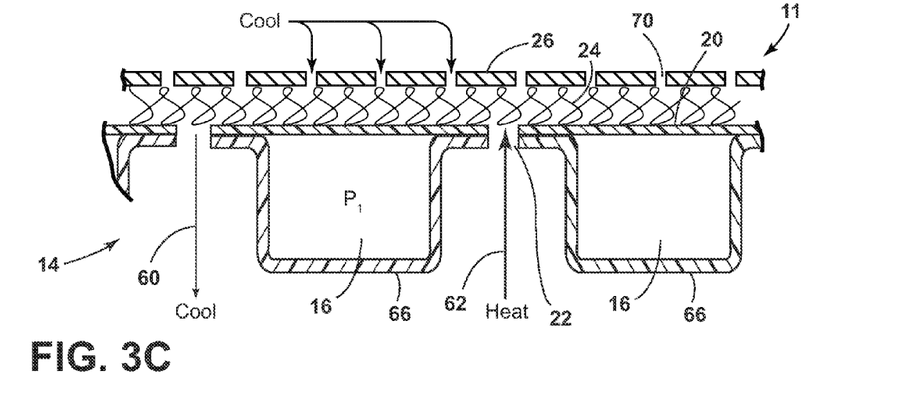
FIG. 3C is a partial side elevational cross-sectional view of an alternative embodiment of an air suspended comfort layer of the present disclosure.

With reference now to FIGS. 3A-3C, various passive air suspended seat comfort layers 11 are illustrated. FIG. 3A illustrates an air suspended seat comfort layer 11 that includes a multi-cell configuration. Specifically, multiple base cells 16 and multiple support cells 18 are illustrated and are separated by the diaphragm 20. In the illustrated embodiment, the base cells 16, the support cells 18, and the diaphragm 20 are all welded together via a heat welding method. The system is then generally positioned on a vehicle seating assembly such that warm air can be drawn from the seat in the direction of arrow 60, or warm air blown out of the seat in the direction of arrow 62. The air moves through the air passages 22, which are not in communication with an inner area defined by the base cells 16 or the support cells 18. The diaphragm 20, the upper skin 64, and the lower skin 66 are all operably coupled via welding, adhesive, etc. at junction areas 72. Notably, the support cells 18 and the base cells 16 include closed configurations such that the pressure in these areas is maintained relatively constant. In the illustrated embodiment of FIG. 3, the support cells 18 are generally defined by the diaphragm 20 and an upper skin 64. The upper skin 64 is generally impermeable such that a steady pressure P1 can be maintained between the upper skin 64 and the diaphragm 20 for an extended period of time. The base cells 16 are generally defined in the space between the diaphragm 20 and a lower skin 66. Similar to the support cells 18, the base cells 16 can be set at a predetermined pressure P2, and that pressure can be maintained for a prolonged period of time because both the diaphragm 20 and the lower skin 66 include a highly impermeable material. The pressure P1 may be less than, equal to, or greater than the pressure P2. If the pressures are equal, it is also contemplated that the support cells 18 may be in communication with the base cells 16.

With reference again to FIG. 3A, as previously noted, air can be drawn into the seat along arrow 60, or blown out of the seat along arrow 62 into the distribution layer 24 where the air is distributed through a top area of the seat, and ultimately blown through apertures 70 defined in the coverstock 26. Air is then blown out towards the occupant to warm the occupant. It is generally contemplated that the coverstock 26 may be comprised of a variety of materials, including perforated leather, permeable fabric, etc.

With reference now to FIG. 3B, the illustrated embodiment depicts an alternative construction, wherein the diaphragm 20 is disposed above both the upper skin 64 and the lower skin 66. In this instance, the pressurization in the support cells 18 can once again be maintained at a predetermined pressure. In the illustrated embodiment, the diaphragm 20 extends over the upper skin 64 and the lower skin 66, and the space between the diaphragm 20 and the upper skin 64 defines the support cells 18. The space between the upper skin 64 and the lower skin 66 defines the base cells 16. As in FIG. 3A, the diaphragm 20, the upper skin 64, and the lower skin 66 are all operably coupled via welding, adhesive, etc. at junction areas 72. For both FIG. 3A and FIG. 3B, it will be generally understood that the pressure P1 in the support cells 18 may be equal to, greater than, or less than a pressure P2 in the base cells 16. In at least one embodiment, the support cells 18 operate at approximately 2 psi.

FIG. 3C generally illustrates yet another embodiment of a passive air suspended seat comfort layer 11. In this embodiment, a plurality of distribution cells are defined between the lower skin 66 and the diaphragm 20. An additional skin in the form of an upper skin is not present. As previously discussed, air can then be drawn from the vehicle seat surface to cool an occupant, or blown toward the vehicle seat surface toward the occupant to warm the occupant, depending on the preference of the occupant.

Figure 4:
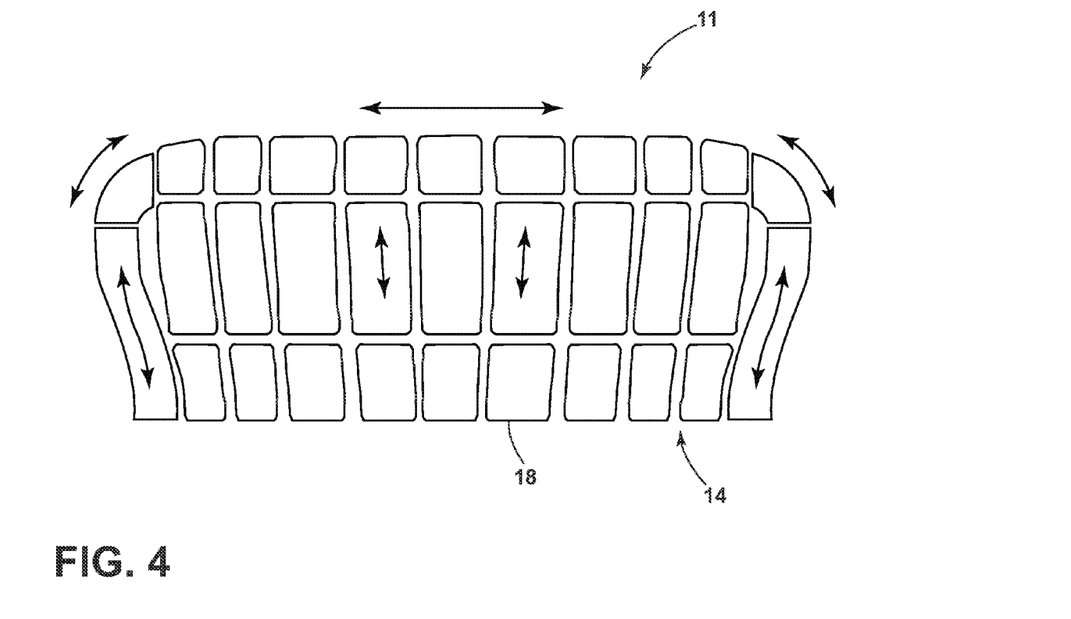
FIG. 4 is a schematic view of the general direction of air flow across the air cells after assembly of one embodiment of an air suspended comfort layer of the present disclosure.

FIG. 4 generally illustrates that the entirety of the seat area is covered with the passive air suspended seat comfort layer 11. The passive air suspended seat comfort layer 11 is generally configured to extend around the seat such that the entire seat is wrapped by the passive air suspended seat comfort layer 11. This configuration can be made as a result of the molding or welding of method used to make the passive air suspended seat comfort layer 11 into a three-dimensional structure. Because the passive air suspended seat comfort layer 11 is wrapped around the vehicle seating assembly 10, the cooling and heating apertures noted above can be positioned on extremities of the vehicle seat 12, including the side bolsters and possibly the sides of the seats.

Figure 5:
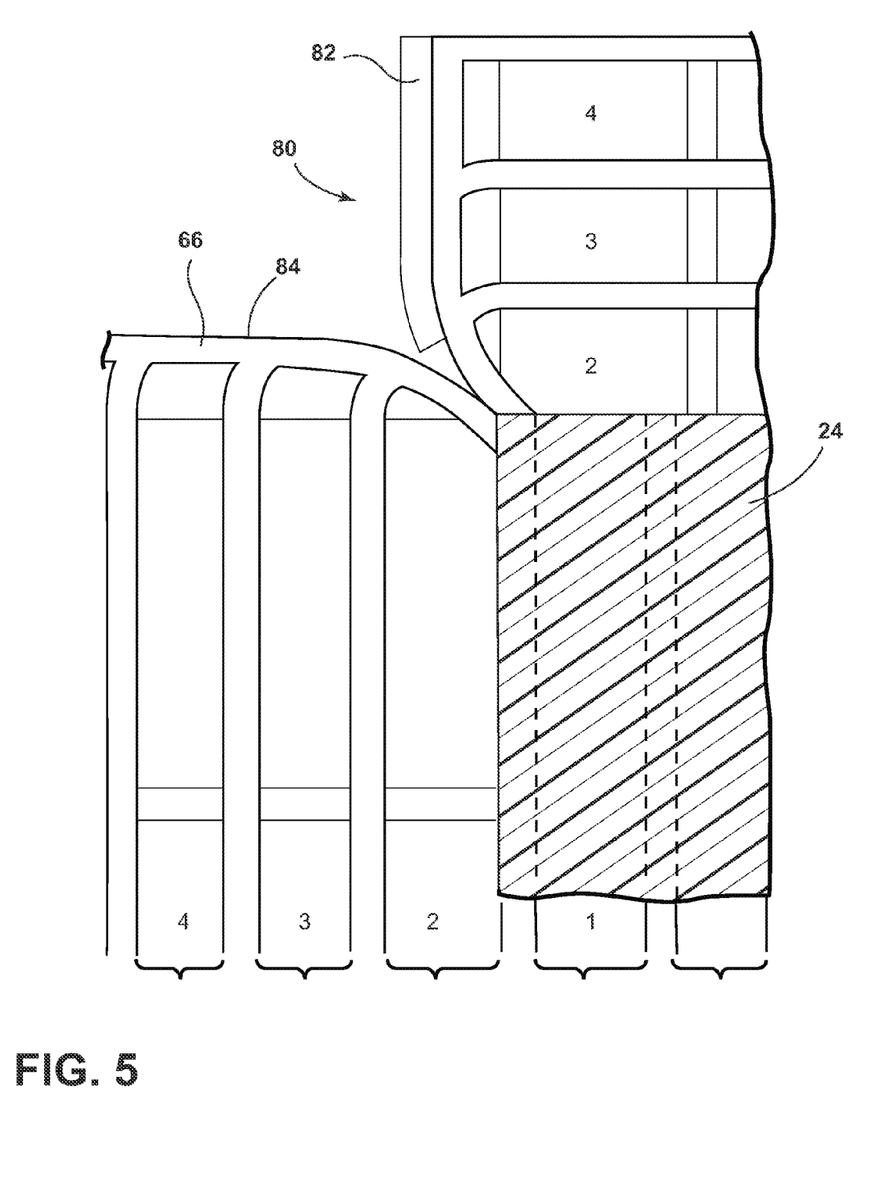
FIG. 5 is a top plan view of a lower skin of the present disclosure after cellular supports have been formed, but before the suspended comfort layer has been shaped to a vehicle seat.

With reference now to FIG. 5, one example of the lower skin 66 after molding, but prior to forming into the passive air suspended seat comfort layer 11 is illustrated. The various cellular supports 14 are already formed in the lower skin 66. In this instance, it is illustrated at an area 80 that forward and side portions of the passive air suspended seat comfort layer 11 are folded down and connected at a welding area 82. The welding area 82 is operably coupled with an edge 84 to form a three-dimensional passive air suspended seat comfort layer 11. The distribution layer 24 is then positioned relatively squarely on the top surface of the vehicle seat 12 proximate the posterior of a seated occupant.

Figure 6:
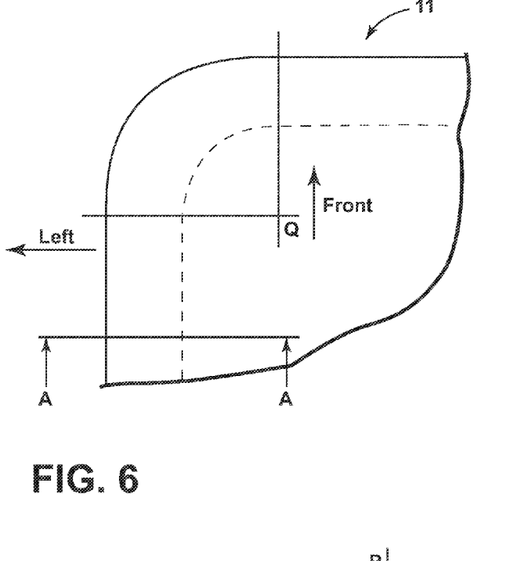
FIG. 6 is a top plan view of a portion of a vehicle seat, including one embodiment of a suspended seat comfort layer of the present disclosure.
Figure 7:
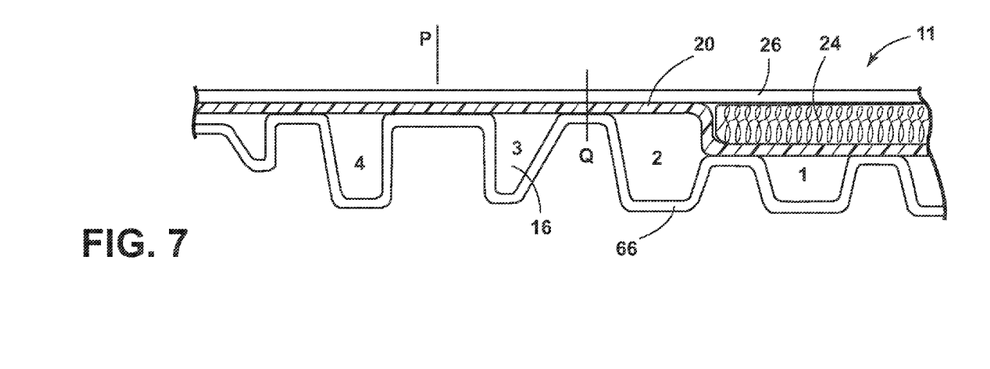
FIG. 7 is a side elevational cross-sectional view of the vehicle seat of FIG. 7 prior to shaping into a vehicle seat.
Figure 8:
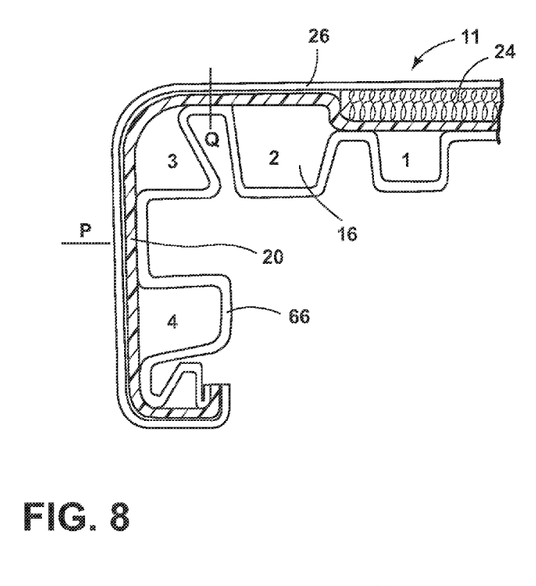
FIG. 8 is a side elevational cross-sectional view of the vehicle seat of FIG. 6 taken at line A-A.

With reference now to FIGS. 6-8, various illustrations depict portions of the vehicle seating assembly 10 and passive air suspended seat comfort layer 11 after being shaped onto the vehicle seating assembly 10. FIG. 7 is a cross-section through a top portion of the vehicle seating assembly 10, as illustrated in FIG. 6. The sections 1, 2, 3, and 4 as illustrated in FIG. 5 depict the lower skin 66, which defines cells between the lower skin 66 and the diaphragm 20 as shown in FIG. 7. Stated differently, once the lower skin 66 is applied to the upper skin 64 or the diaphragm 20, the base cells 16 are defined. The base cells 16 in FIG. 7, which correspond to the numbers 1, 2, 3, and 4, correspond to the numbers 1, 2, 3, and 4 in FIG. 5 (which illustrates the flat stock of the material prior to being shaped to form the vehicle seating assembly 10). After the lower skin 66 has been applied to the diaphragm 20, the passive air suspended seat comfort layer 11 is then rounded to form the top and front portions of the vehicle seating assembly 10 (see FIGS. 4, 6, and 8).

Figure 8A:
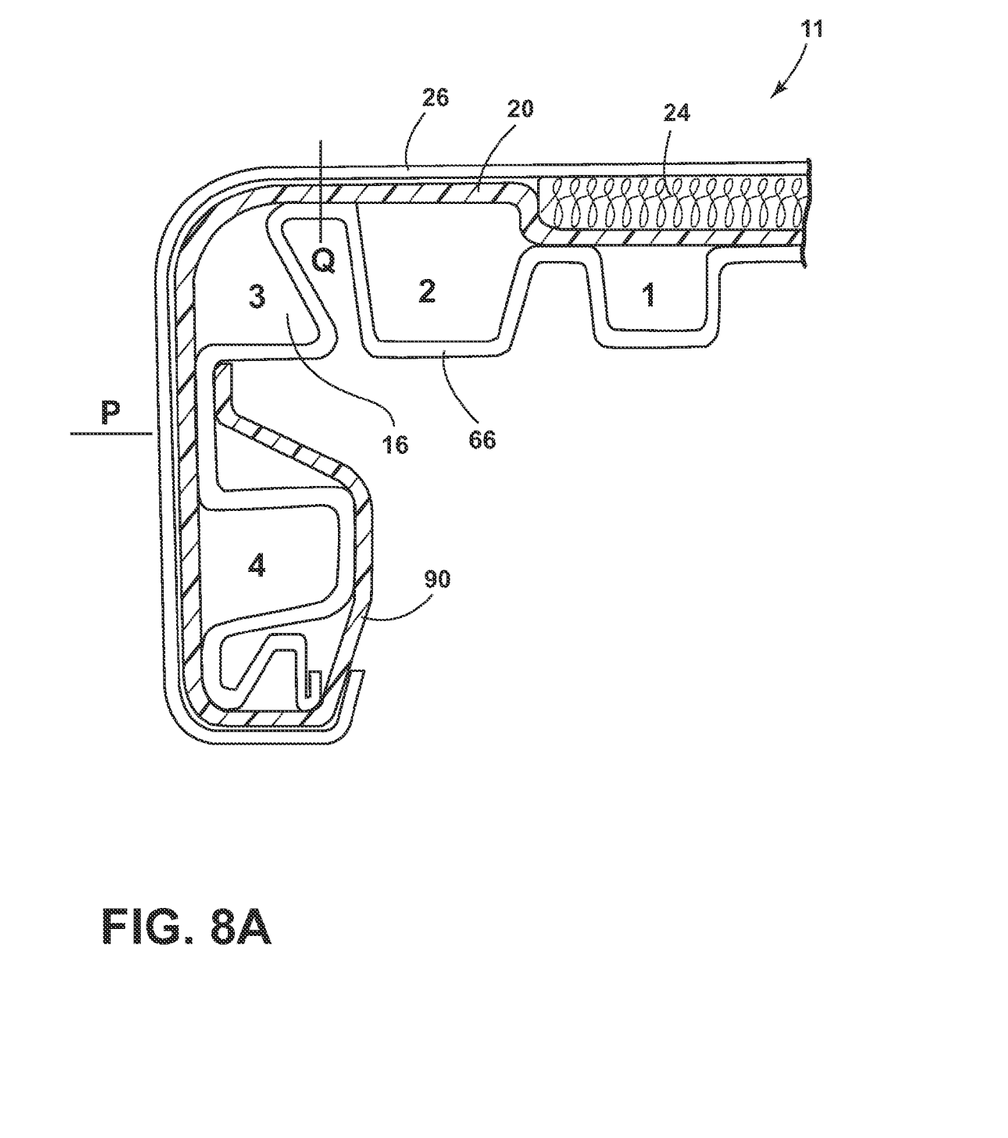
FIG. 8A is a side elevational cross-sectional view of an alternate construction for a vehicle seating assembly of the present disclosure.
Figure 9:
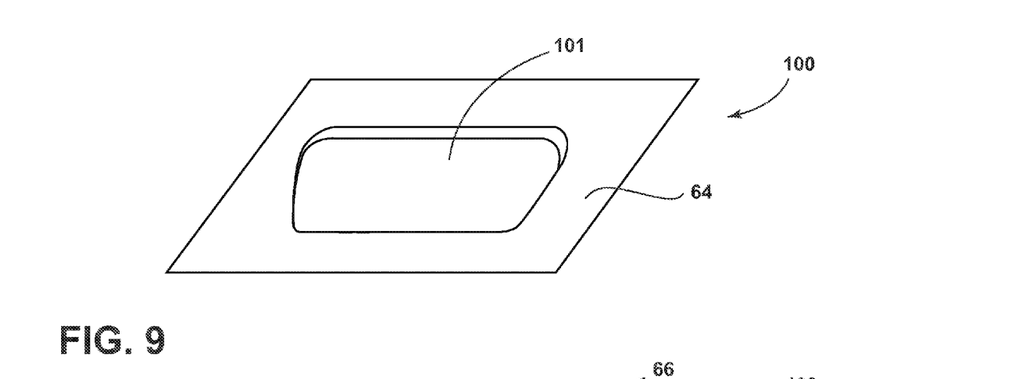
FIG. 9 is a top perspective view of an upper skin after preforming to provide a nest for a distribution layer.
Figure 10:
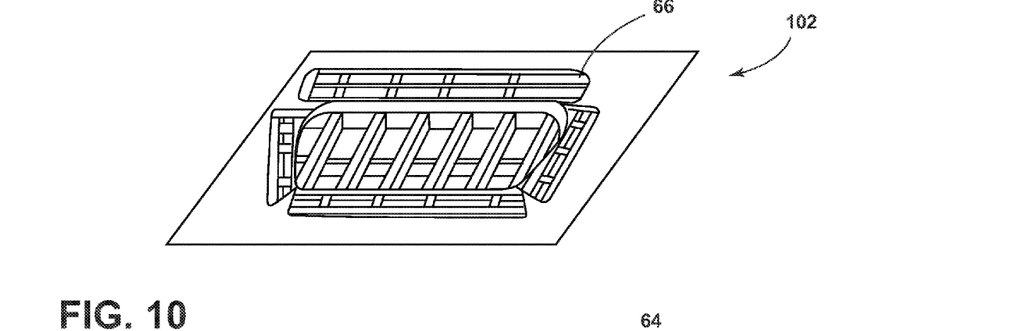
FIG. 10 is a top perspective view of a lower skin after vacuum preforming to define partitioned air cells.

An alternative construction, as shown in FIG. 8A, illustrates the passive air suspended seat comfort layer 11 with an extended portion 90 of the diaphragm 20 wrapping around at least one and possibly two of the base cells 16 defined between the lower skin 66 and the diaphragm 20. This design provides a slightly more robust front portion of the vehicle seating assembly 10. The coverstock 26 also wraps around the base cells 16, albeit not as far as the extended portion 90.

Figure 11:
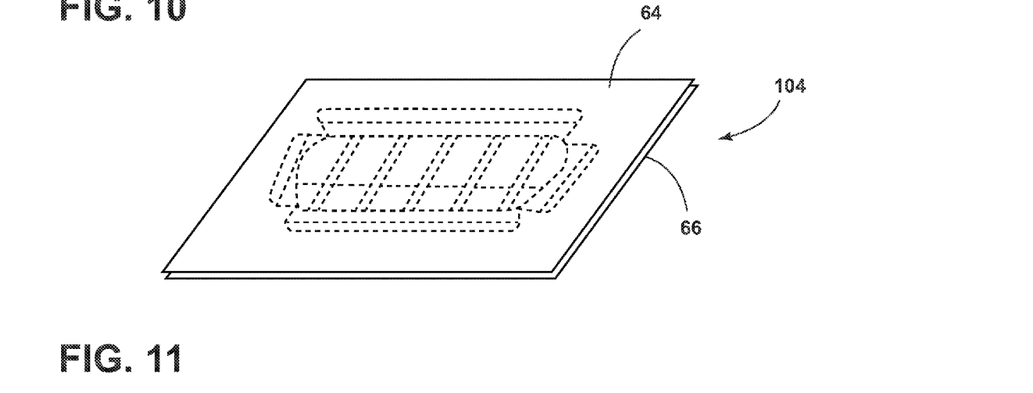
FIG. 11 is a top perspective view of the upper skin after welding to the lower skin.

With reference now to FIGS. 9-16, the desired method of constructing the passive air suspended seat comfort layer 11 is illustrated. Specifically, in step 100, the upper skin 66 is vacuum pre-formed to provide a nest, or recess 101, for the distribution layer 24. The upper skin 66 has a nesting area that is generally consistent in size with the area that is defined by the lower skin 66 and which defines partitioned air cells, which will make up the support cells 18 and/or the base cells 16. In step 102, the lower skin 66 is vacuum pre-formed to provide the partitioned air cells. In step 104, as shown in FIG. 11, a progressive platen welding system is utilized to attach the upper skin 64 to the lower skin 66 in a step variable pressure cell. Snaps that may be utilized to attach the comfort layer to the supportive layer are welded in place during this step.

Figure 12:
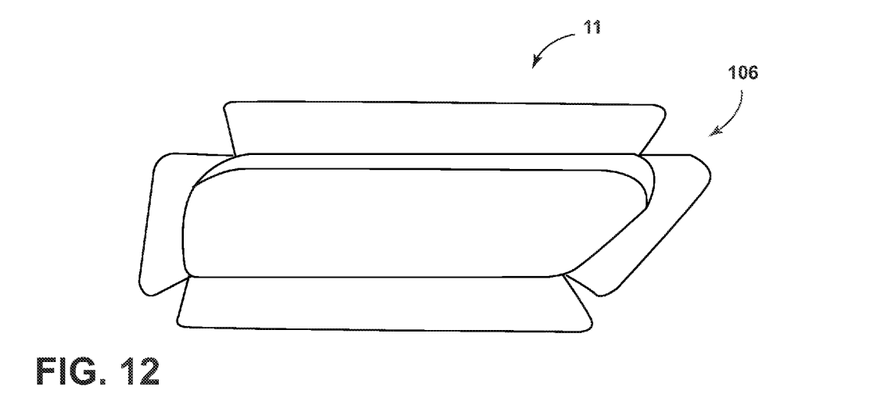
FIG. 12 is a top perspective view of the air suspended seat comfort layer after completion of a punch trim operation.
Figure 13:
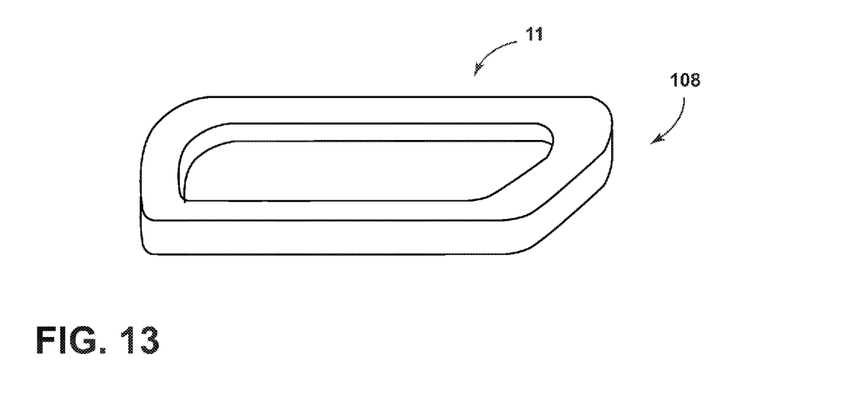
FIG. 13 is a top perspective view of the air suspended seat comfort layer with the sides folded down and welded to form a three-dimensional air suspended seat comfort layer.
Figure 14:
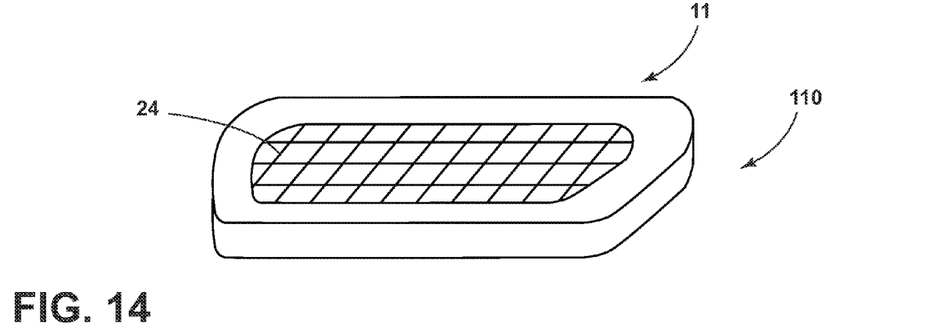
FIG. 14 is a top perspective view of the air suspended seat comfort layer with an open weave air distribution layer positioned therein.
Figure 15:
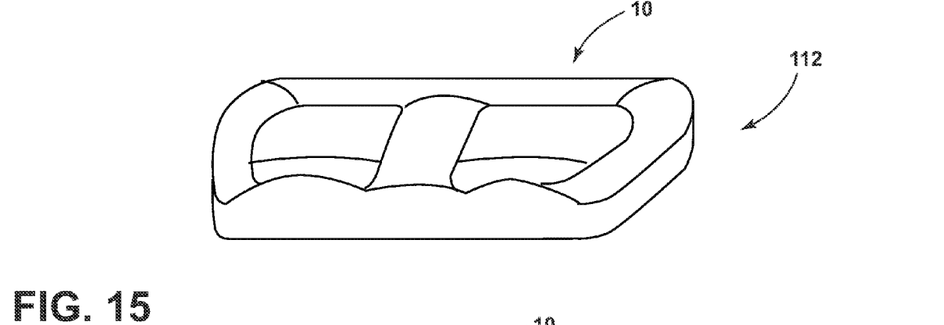
FIG. 15 is a top perspective view of the air suspended seat comfort layer with a trim cover positioned thereover.
Figure 16:
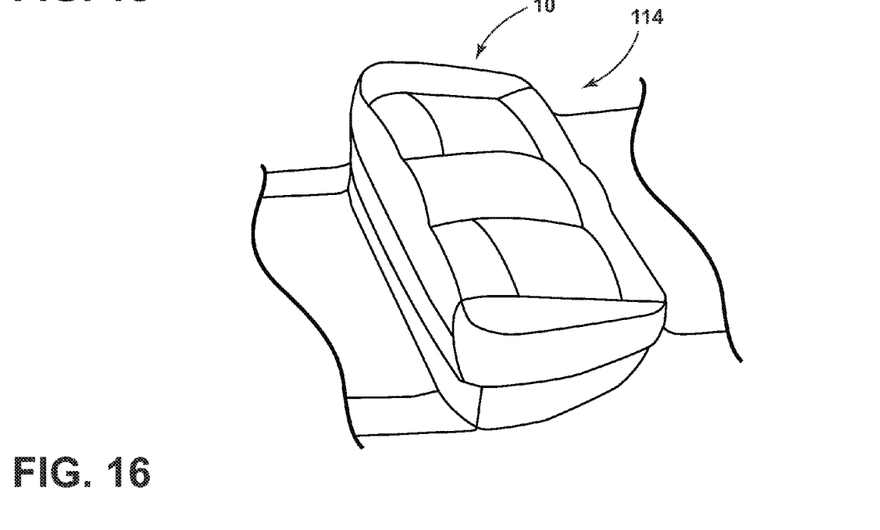
FIG. 16 is a top perspective view of the complete air suspended comfort layer on a vehicle seating assembly positioned in the vehicle.

With reference now to FIG. 12, in step 106, a punch trim operation is used to punch out the flat welded assembly. Notably at this point, the support cells 18 have been defined and in step 108, as illustrated in FIG. 13, the sides are folded down and the corners are welded to complete the cover. In step 110, the open weave air distribution layer 24 is inserted into the nest defined in the distribution layer 24. In step 112, a comfort layer is wrapped by a pre-made trim cover that is perforated, which defines the breathable coverstock 26. After being wrapped with the trim cover, the entire assembly is positioned in a vehicle and fastened in place.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:
1. A vehicle seating assembly comprising:
  a seating frame;
  a plurality of cellular supports including:
    multiple base cells; defined between a lower skin and an upper skin
    multiple support cells defined between the upper skin and a generally flat diaphragm, the multiple support cells disposed directly above and including a different air pressure than the base cell wherein the lower skin wraps around side walls of the upper skin and substantially surrounds the support cells; and an air passage defined through the diaphragm and between adjacent cellular supports;

an open air distribution layer above and adjacent to the diaphragm; and a breathable coverstock extending over the distribution layer.

2. The vehicle seating assembly of claim 1, wherein the support cells are pressurized to approximately 2 psi.

3. The vehicle seating assembly of claim 1, wherein the diaphragm is disposed between the support cells and the open air distribution layer.

4. The vehicle seating assembly of claim 1, wherein the support cells include a lower air pressure than the base cells.

5. The vehicle seating assembly of claim 1, wherein air is drawn into a seat during a cooling operation and is blown from the seat during a heating operation.

* * * * *

UNITED STATES PATENT AND TRADEMARK OFFICE
CERTIFICATE OF CORRECTION

PATENT NO. : 9,751,440 B2  
APPLICATION NO. : 14/939767  
DATED : September 5, 2017  
INVENTOR(S) : Dry et al.

Page 1 of 1

It is certified that error appears in the above-identified patent and that said Letters Patent is hereby corrected as shown below:

In the Claims

Column 6, Claim 1, Line 62:
After "cells" delete ";".
Column 6, Claim 1, Line 63:
After "skin" insert --;--.
Column 6, Claim 1, Line 67:
"base cell" should be --base cells,--.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*